Oct. 13, 1931.  E. F. MAAS  1,827,662
PNEUMATIC TIRE INFLATION SYSTEM
Filed Nov. 16, 1927  5 Sheets-Sheet 5

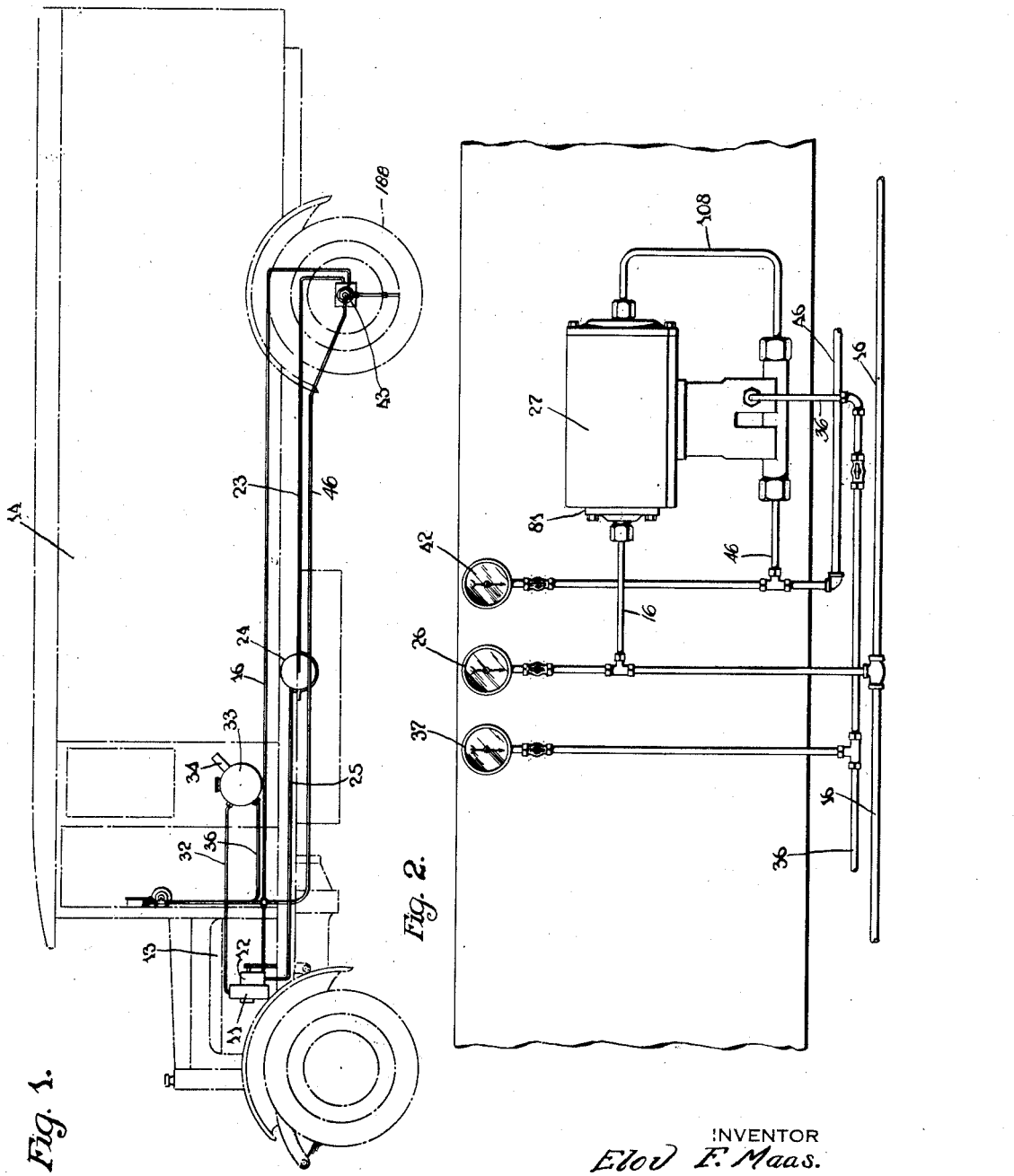

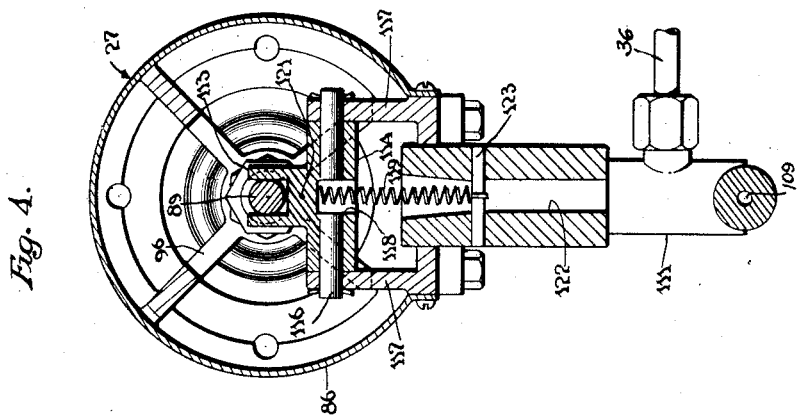
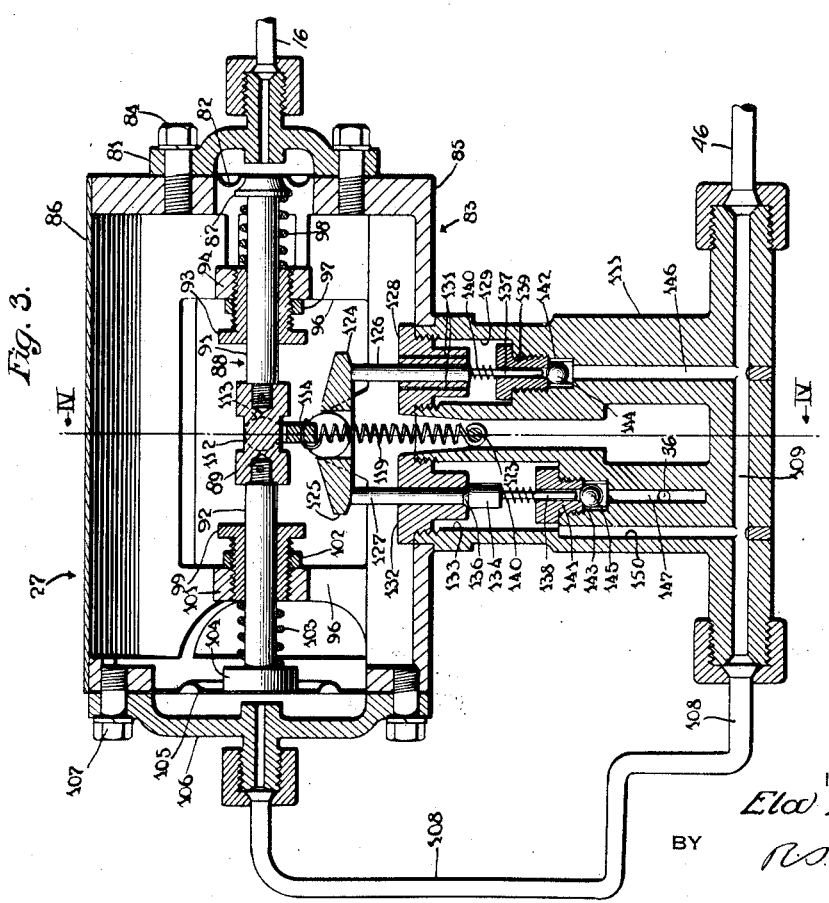

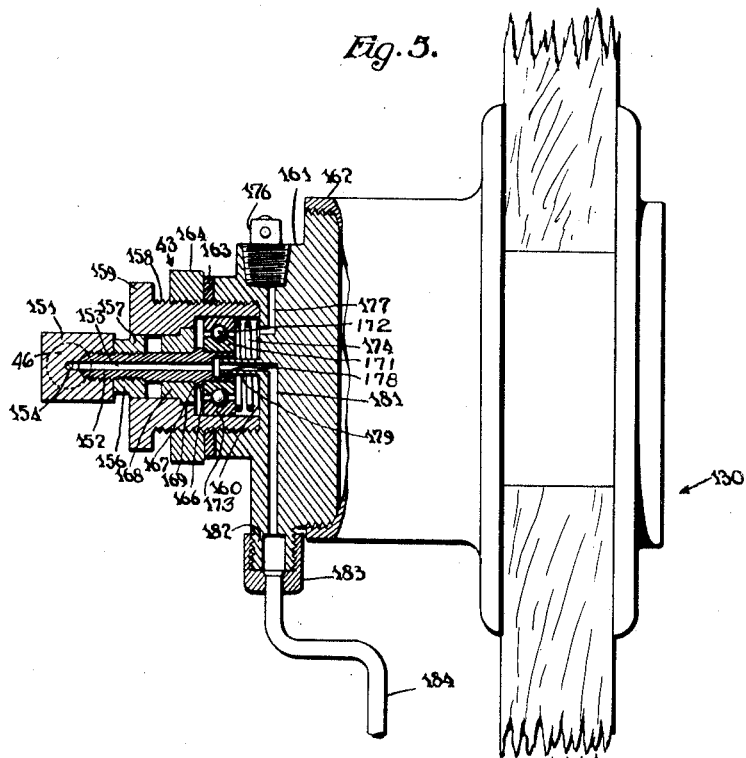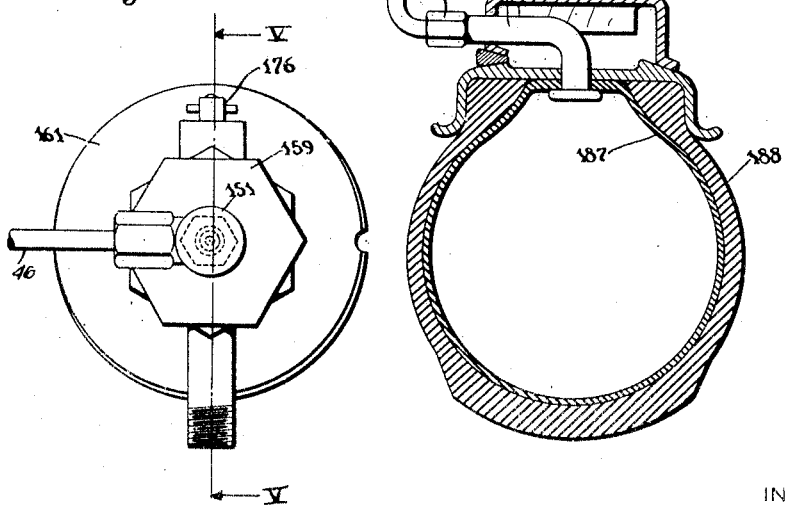

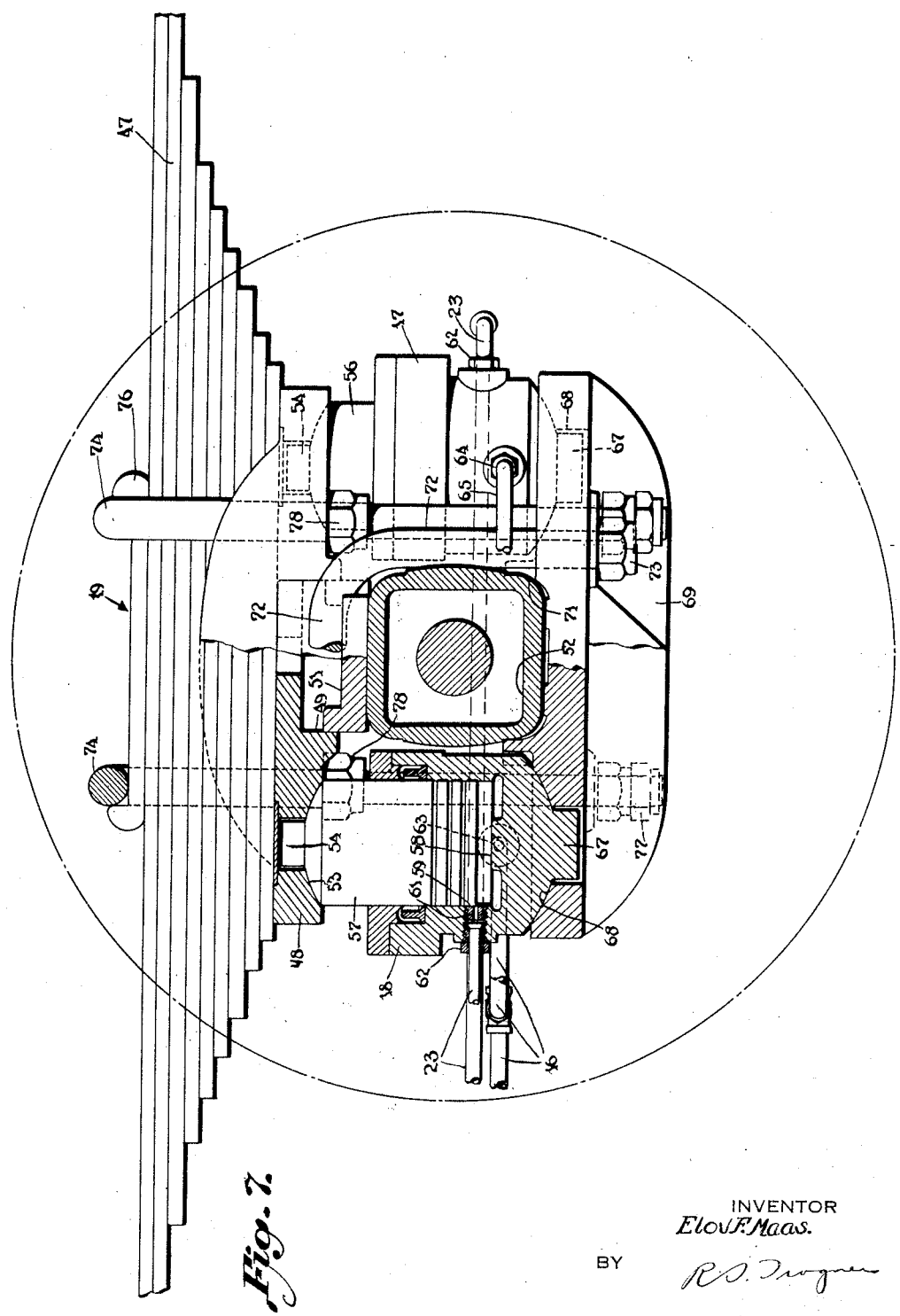

INVENTOR
Elov F. Maas.
BY
ATTORNEY

Patented Oct. 13, 1931

1,827,662

UNITED STATES PATENT OFFICE

ELOV F. MAAS, OF AKRON, OHIO, ASSIGNOR TO THE GOODYEAR TIRE & RUBBER COMPANY, OF AKRON, OHIO, A CORPORATION OF OHIO

PNEUMATIC TIRE INFLATION SYSTEM

Application filed November 16, 1927. Serial No. 233,732.

My invention relates to apparatus for inflating pneumatic load sustaining elements and has particular relation to apparatus of the above designated character which shall be especially applicable for inflating pneumatic tire casings of the type employed on motor vehicles.

One object of the invention is to provide an apparatus for so inflating pneumatic tires as to enable a tire to render the maximum service of which it is capable.

Another object of the invention is to provide an apparatus for varying the fluid pressure in the pneumatic tires of a vehicle in proportion to the load carried thereby.

Prior to this invention, pneumatic tires have been inflated to a constant pressure for which the tire was designed, which pressure was proportional to the average load supported by the tire. A tire was not properly inflated when the maximum load for the vehicle was being sustained by the tire and the same was true with an empty vehicle. Consequently, the proper ratio between the inflation pressure of the tire and the load imposed thereon was maintained only upon rare occasions. The load imposed upon the tires of large trucks and busses often varies periodically between widely separated limits and the tires of such vehicles serve under the severe handicap of being over or under inflated a greater portion of the time. Since it is well known that the maximum service cannot be obtained from a pneumatic tire which is not properly inflated, it is apparent that the mileage now obtained on the tires of such vehicles might be increased greatly if the inflation pressure of the tires were maintained at a ratio which remained constant as the load on the vehicle varied.

The invention comprises a fluid supplying device which is adapted to run continuously during the operation of the vehicle and to supply fluid under pressure for the purpose of increasing the pressure within the tires whenever the load on the vehicle is increased. A pressure regulating device is employed for the purpose of controlling the flow of fluid to the tires, this device being operable either manually or automatically, depending upon the degree of convenience desired.

The manually operable embodiment of the invention includes a hand wheel adjusting device which is provided with a scale for indicating various pressures obtainable. The hand wheel is adjustable for providing the desired inflation pressure for the tires when the load on the vehicle is varied.

The automatically operable embodiment of the invention comprises a fluid regulating device arranged between the axle of the vehicle and a portion of the frame thereof adjacent thereto. The pressure of this fluid is transmitted by a conduit to the pressure regulating device which is automatically actuated by the fluid for admitting the inflating fluid to the tires and thus the proper inflation of the tires is maintained.

For the purpose of simplifying the disclosure, I have illustrated the apparatus, as employed for inflating only one of the tires of a vehicle. However, it is apparent that a single apparatus is capable of controlling the inflation of any number of tires by the mere application of additional fluid conveying conduits.

For a better understanding of the invention, reference may now be had to the accompanying drawings, forming a part of this specification, in which:

Fig. 1 is a side elevational view of a motor vehicle employing an automatically operable tire inflating apparatus according to one embodiment of my invention;

Fig. 2 is a fragmentary elevational view of a portion of the dash of the vehicle shown in Fig. 1 and illustrating the arrangement of the conduits associated with the automatic regulating device;

Fig. 3 is a cross-sectional elevational view of the automatically operable pressure regulating device illustrated in Figs. 1 and 2;

Fig. 4 is a cross-sectional view of the regulating device taken substantially along the lines IV—IV of Fig. 3;

Fig. 5 is a fragmentary view, partly in elevation and partly in cross-section, of a wheel for a motor vehicle provided with a pneumatic tire and a swivel connection through which the inflating fluid for the tire is supplied;

Fig. 6 is an end elevational view of the swivel connection illustrated in Fig. 5;

Fig. 7 is a view, partly in elevation and partly in cross-section, of the axle and spring assembly of the rear wheel of a motor vehicle employing a confined fluid load sustaining device for controlling the operation of the automatically operable pressure regulating device;

Figure 8:
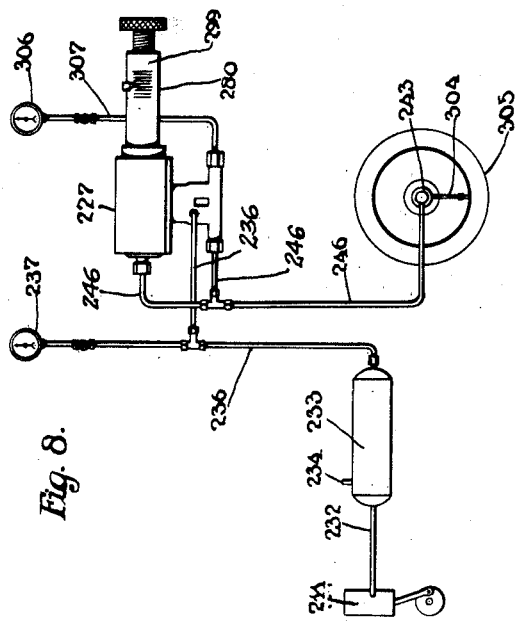
Fig. 8 is a diagrammatical illustration of the manually operable pressure regulating apparatus, which comprises one embodiment of my invention.
Figure 9:
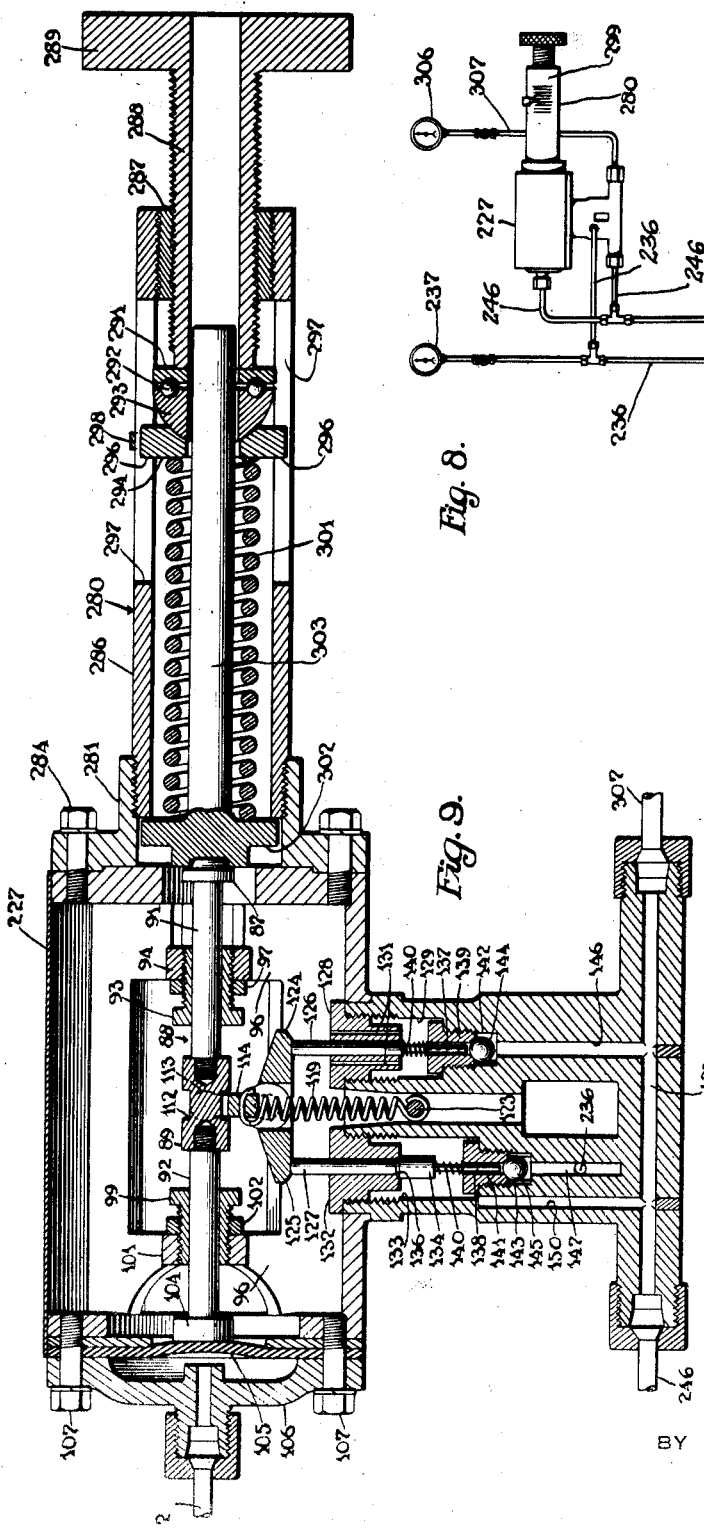
Fig. 9 is a cross-sectional elevational view of the manually operable pressure regulating device employed in the embodiment of the invention illustrated by Fig. 8.

Referring to the embodiment of the invention shown by Fig. 1, a pair of fluid compressors or pumps 11 and 12 are employed which are of any suitable conventional type and are adapted to be driven continuously by an engine 13 employed in propelling a motor vehicle 14. The pump 12 supplies oil or other suitable fluid through a conduit 16 to cylinders 17 and 18, (Fig. 7) which comprise a portion of a load transmitting unit 19. The oil from the cylinders 17 and 18 is discharged through conduit 23 into an oil supply tank 24, from which the oil is returned to the suction side of the pump 12 by a conduit 25. The oil supplying conduit 16 also is connected to a pressure gauge 26 and to an automatically operable pressure regulating device 27, as indicated in Fig. 2.

The pump 11 (Fig. 1) is adapted to supply air or other suitable inflating fluid through a conduit 32 to a supply tank 33, which is provided with a safety valve 34. A conduit 36 conveys the air from the supply tank 33 to the regulating device 27 and an air gauge 37 is preferably attached to the conduit 36 (Fig. 2). The air is delivered by a conduit 46 from the regulating device 27 to a swivel connection 43 (Fig. 5) adjacent the rear wheels, which is in turn connected with the tire or other body which is to be inflated. An air gauge 42 may be connected to the conduit 46 so that the pressure in the tire will be indicated at all times to the operator or driver.

*The vehicle load transmitting unit*

The load transmitting unit (Fig. 7) comprises a spring 47, which is connected by suitable shackles to a longitudinal frame member (not shown) of the vehicle. The lower central portion of the spring 47 supports a plate 48, provided with a recess 49 adjacent the central portion thereof for receiving a guide plate 51 rigidly secured to the upper surface of an axle 52. Openings 53 are formed in the plate 48, on opposite sides of the recess 49, which openings are adapted to receive supporting shanks 54, formed on the upper ends of each of a pair of pistons 56 and 57. The pistons 56 and 57 are adapted to fit snugly within the internal surface of the cylinders 17 and 18.

The cylinders 17 and 18 are provided with bosses 58 which extend a short distance above the adjacent surface at the lower ends of the cylinders. These bosses are adapted to serve as abutments for limiting the downward movement of pistons 56 and 57. Plugs 59, having relatively small orifices 61 formed therein, are threaded in openings formed in the cylinders 17 and 18. The plugs are so located with respect to the bosses 58 that the orifices 61 are spaced a short distance beyond the upper ends of the bosses. The conduit 23 is provided with connections 62 that threadably engage the openings in the cylinders 17 and 18 respectively beyond the plugs 59. The cylinders 17 and 18 also are provided with openings 63 arranged below the upper surface of the bosses 58 for receiving plugs 64 to which the conduit 16 and the branches thereof are connected.

The lower extremities of the cylinders 17 and 18 are provided with shanks 67, similar to the shanks 54, that extend into spaced openings 68 formed adjacent the opposite ends of a yoke 69. The central portion of the yoke 69 is provided with a recess 71 adapted to receive the lower portion of the axle 52. Spaced shackle bolts 72 engage the opposite ends of the guide plate 51 extending beyond the plate 48 and the threaded ends thereof extend through openings formed in the yoke 69. Nuts 73 engage the threaded ends of the shackle bolts 72, thereby securing the yoke in suspended relation to the axle 52.

In order to prevent the pistons 56 and 57 from becoming displaced substantially above the orifices 61 in the cylinders 17 and 18 respectively, a pair of shackle bolts 74 are provided for limiting the possible separation of the spring 47 and the yoke 69. The shackle bolts 74 are supported at the upper ends thereof, by the opposite ends of a plate 76, and extend therefrom, through openings in the plate 48 and the yoke 69. Lock nuts 77 are so positioned on the threaded ends of the shackle bolts 74 as to provide a slight space between the nuts and the yoke 69 when the lower edge of the pistons 56 and 57 are directly opposite the orifices 61. Nuts 78 threadably engage the shackle bolts 74 immediately beneath the plate 48 and maintain the latter rigidly in engagement with the spring 47.

In the operation of this unit, the load carried by the spring 47 urges the pistons 56 and 57 toward the bosses 58 at the bottoms of the cylinders 17 and 18. However, the conduit 16 continuously supplies oil from the pump 12 to the cylinders, and the pressure of the oil thus supplied is always great enough to move the pistons 56 and 57 against the load thereon in a direction away from the bosses 58. When the orifices 61 are uncovered by the lower edge of the pistons 56 and 57, they permit the discharge of oil from the cylinders and thus prevent or limit further movement of the pistons.

It is apparent that the total pressure of the oil in the cylinders 17 and 18 tending to raise the pistons 56 and 57 is substantially equal to the load carried by the vehicle. It is likewise apparent that the unit pressure of the oil in the cylinder is equal to the unit pressure of the oil in the conduit 16, since this conduit is connected to the cylinders 17 and 18. This pressure is readable in pounds or other suitable units on the gauge 26, which is attached directly to the conduit 16.

*Automatically operable pressure regulating device*

The pressure also is transmitted by conduit 16 to a region beyond a head 81 (see Figs. 3 and 4) of the automatically operable regulating device 27. A diaphragm 82 is positioned between the inner surface of the head 81 and the surface of the end of a housing 83 of the regulating device 27. The head 81 and the diaphragm 82 are rigidly secured to the housing by means of bolts 84. The housing 83 comprises a frame 85, which is partially surrounded and enclosed by a cylindrical casing 86. A diaphragm seat 87, adapted to rest against the inner surface of the diaphragm 82, is mounted on one end of a reciprocable member 88 which comprises a central block 89 having a pair of oppositely disposed rods 91 and 92 threadably engaging opposite ends thereof. The rod 91 is slidably mounted in a bearing plug 93, threaded into a centrally disposed enlargement 94, which is supported by a plurality of webs 96 extending radially from portions of the frame 85.

A lock nut 97 is adapted to be positioned on the bearing plug 93, by reason of which, any desired longitudinal adjustment of the plug, within the enlargement 94, may be made. A coil spring 98 surrounds the end of the rod 91 and is supported at its opposite ends against the diaphragm seat 87 and one end of the bearing plug 93. The degree of compression of the spring 98 is varied by the aforementioned longitudinal adjustment of the plug 93. The rod 92, at the opposite end of the reciprocable member 88, is likewise provided with a bearing plug 99 threadably engaging an enlargement 101 also supported by the radially extending web members 96. Also, a lock nut 102 is adapted to vary the position of the plug 99 longitudinally of the rod. A coil spring 103 is mounted on the rod 92 between the plug 99 and a diaphragm seat 104 rigidly mounted on the end of the rod. The seat 104 rests against the inner surface of a diaphragm 105 that is bolted between the frame 85 of the housing 83 and a head 106, as indicated at 107. The space within the head 106 communicates, through a conduit 108, with a duct 109 extending horizontally through the lower portion of a valve mechanism housing 111. The opposite end of the duct 109 is connected to the conduit 46 which communicates with the swivel connection 43 adjacent the tires to be inflated, as hereinbefore described.

The ratio of the area of the diaphragm 105, exposed to the pressure of the air in the head 106, to the area of the diaphragm 82, exposed to the pressure of the oil in the head 81, is equal to the ratio, between the area of a portion of a properly inflated pneumatic tire engaging a roadway, and the combined areas of the end surfaces of the pistons 56 and 57. The springs 98 and 103 are adapted to be so adjusted as to balance the reciprocable member 88 between the diaphragms 82 and 105. It is apparent that when the pressure of either of the fluids in the heads 81 and 106, varies from the proper ratio of inflation to load, the diaphragms 82 and 105 will be deflected by equal amounts in the same direction and thus displace the centrally disposed reciprocable member 88 from its normal position.

The block 89 between the rods 91 and 92 is provided with a circumferential groove 112, which is adapted to receive the circular ends of a pair of spaced fingers 113. The fingers 113 extend normally from the upper portions of a block 114 that is pivotally mounted upon pins 116 extending through openings formed in spaced vertical supports 117 that are formed on the frame 85 of the housing 83. A recess 118 formed in the lower portion of the block 114, extends upwardly to a point above the axis of the block. The upper end of a coil spring 119 is located within the recess 118 and is secured in an opening 121 formed in the block above the recess. The lower portion of the spring 119 extends into an opening 122 formed adjacent the central portion of the valve mechanism housing 111, and the lower end of the spring is secured on a pin 123 that extends across the opening 122. A pair of oppositely disposed arms 124 and 125 extend from the block 114 perpendicularly to the axis of the pins 116 and rest normally on the upper ends of spaced vertical pins 126 and 127. The pin 126 is slidably journaled in an elongate nut 128, which threadably engages an opening 129 formed in the upper portion of the valve mechanism housing 111.

Longitudinal openings 131 extend through the nut 128 and form communicating passages between the opening 129 and the interior of the housing 83. The pin 127 also slidably engages an elongate nut 132 threadably mounted in an opening 133 formed in an upper portion of the valve mechanism housing 111, the lower end of the pin being provided with an enlargement 134 having a tapered seat 136 at the upper portion thereof, which, when the pin is in its normal position, engages a correspondingly tapered seat formed in the nut 132. Small elongate pins 137 and 138 are rigidly mounted in the lower ends of the pins 126 and 127 respectively and are adapted to fit loosely in longitudinal openings formed in nuts 139 and 141. Springs 140, surrounding the pins 137 and 138, are adapted to be compressed between the pin 126, the enlargement 134 of the pin 127, and the nuts 139 and 141 respectively. The nuts 139 and 141 are threadably mounted in openings 142 and 143 that are formed in the valve mechanism housing 111 beneath the openings 129 and 133. Balls 144 and 145 are mounted in the openings 142 and 143 respectively and are adapted to seat in the lower ends of the openings formed in the nuts 139 and 141. In their normal position the ends of the pins 137 and 138 are equally spaced from the balls 144 and 145.

The opening 142 is connected by a duct 146 to the duct 109. The opening 133 also is connected to the duct 109 by a duct 150. The opening 143 communicates through a duct 147 with the conduit 36 that supplies air from the tank 33. When the reciprocable member 88 is moved from its normal central position, as hereinbefore described, it is apparent that the block 114 will be rotated upon its axis and the arms 124 and 125 will be so tilted as to depress one of the pins 126 or 127. Inasmuch as the spring 119 is connected to the block 114 at a point above its axis, the arms 124 and 125 will be resiliently forced toward an inclined position whenever the reciprocable member 88 is displaced substantially from its central position. For example, if the load on the vehicle suddenly is increased, the pump 12 will be required to operate against an increased head in the conduit 16 in order to maintain the pistons 56 and 57 in such position that some of the oil will be discharged through the orifices 61. Consequently, a greater pressure will be transmitted immediately to the diaphragm 82, as a result of which unequal forces will be applied at opposite ends of the reciprocable member 88. The block 114 thus will be so tilted on its axis as to cause the arm 125 to depress the pin 127. When the first movement of the reciprocable member 88 occurs, the spring 119 will accelerate the movement of the block 114 upon its axis and the pin 127 thus quickly displaces the ball 145 from its seat. Air from the supply tank 33 is thus permitted to pass into the opening 133 and the ducts 150 and 109. Since these ducts are connected to the head 106 by the conduit 108, the pressure against the diaphragm 105 will be increased and when the force on the diaphragm seat 104 is sufficiently great to balance the force on the seat 87, the reciprocable member 88 again will be moved into its normal position and thus permit the ball 145 to seat upon the nut 141 thereby closing the air passage therethrough.

Conversely, if a portion of the load on the vehicle is removed, the pressure against the diaphragm 82 will be proportionately decreased and the reciprocable member will move in that direction thus rotating the block 114 and causing the displacement of the ball 144 from its seat. The pressure in the duct 109 is thus reduced by the escapement of the air through the openings 131, which reduction in pressure is transmitted to the diaphragm 105 by the conduit 108. Eventually the reciprocable member 88 is permitted to assume its normal position and the ball 144 to seat on the nut 139.

*Swivel and wheel assembly*

The swivel 43 (Figs. 5 and 6) comprises a block 151, that is rigidly secured to the end of the conduit 46 and thus is prevented from rotation with a wheel 130 of the vehicle. A plug 152, having a duct 153 formed longitudinally thereof, is threadably mounted in an opening in the block 151, the opening 153 communicating with the conduit 46 through a duct 154 formed angularly in the block 151. The plug 152 also threadably engages a bearing ring 156 which ring is adapted to be locked rigidly on the plug by engagement with the block 151. A circular flange 157 is formed on the ring 156, which is adapted to serve as a relatively loose-fitting bearing surface, for the ring, against the internal surface of an externally threaded collar 158. The outer end of the collar 158 is constructed in the form of a nut 159 for engagement with a suitable wrench for tightening the collar. The opposite end of the collar 158 is adapted to engage a threaded opening 160 in the center of a plug 161 which threadably engages the outer end of a hub 162 of the wheel 130. In tightening the collar 158 in the block 161, it engages the bottom of the opening 160 and is maintained in this position by a suitable locking washer 163 and nut 164.

A circular projection 166 is formed adjacent the inner end of the plug 152 and the outer edge of the projection is inclined to form a tapered seat 167. A bearing ring 168, composed of lignum vitae, or other suitable material, is adapted to be positioned on the plug 152 adjacent the ring-like projection 166 and has a correspondingly tapered portion adapted to fit against the tapered seat 167. The bearing ring 168 also is provided with a shoulder 169 that is adapted to bear against a corresponding shoulder formed adjacent the outer end of the collar 158. The inner race 171 of a ball bearing 172 is non-rotatably disposed on the end of the plug 152 immediately adjacent the ring-like projection 166. The outer race 173 of the bearing 172 is similarly secured in an enlarged portion within the collar 158.

A spring 174 is compressed between the outer race 173 and the plug 161. The ball race 172 thus transmits the thrust from the spring 174 to the plug 152, which thrust is opposed by the tapered seat formed on the bearing ring 168. A ball closed grease gun connection 176 is threaded in an opening formed in the plug 161 and is adapted to communicate through a duct 177 with the opening 160. The opening 160 normally is adapted to be substantially filled with any suitable kind of grease supplied through the connection 176. At the inner end of the plug 152, a relatively large opening, indicated at 178, is adapted to receive the end of a cylindrical shank 179 which projects normally from the center of the plug 161. The end of the shank 179 is substantially smaller than the opening 178 in order to prevent any wear on either of the elements.

The opening 178 in the plug 152 communicates with a duct 181 formed in the shank 179 and the main portion of the plug 161. The duct terminates at the edge of the plug in a threaded lug 182, which is adapted to be engaged by a coupling 183 on one end of a conduit 184. The opposite end of the conduit 184 is connected to a valve stem 186 from which the interior valve mechanism has been removed.

It is apparent from the foregoing description of the swivel that the block 151, the plug 152, the ring 156 and the inner race 171 of the ball bearing 172 are relatively rotatable with respect to the threaded collar 158, the lignum vitae bearing ring 168, the outer race 173 of the bearing 172, the plug 161 and the several elements of the wheel 130. Air from the conduit 46 is supplied to the swivel 43 thence through the ducts 153 and 181 to an inner tube 187 of a pneumatic tire casing 188. It is apparent from the foregoing description that the pressure of the air in the pneumatic tire casing 188 is substantially equal to the pressure of the air in the duct 109.

*Manually operable inflating apparatus*

In the manually operable apparatus illustrated by Fig. 8, a pump 211 is continuously driven by the engine of the motor vehicle in connection with which the apparatus is employed. This pump delivers air under pressure through a conduit 232 to an air supply tank 233, which is provided with a safety valve 234. From the tank 233, the air is conveyed through conduits 236, 239 and 241 to an air gauge 237 and to a regulating device 227. The regulating device 227 is substantially identical to the automatically operable regulating device 27, except that the head 81 and the diaphragm 82 is replaced by a manually operable adjusting device 280. Accordingly, the description of the corresponding elements of the two devices will not be repeated.

The adjusting device 280 is provided with a flanged collar 281 adapted to be rigidly secured to the regulating device 227 by bolts indicated at 284. A tube 286 threadably engages the collar 281 at one end and at its opposite end receives an annular ring 287 threadably mounted therein. The ring 287 also threadably engages an externally threaded tubular member 288, at the outer end of which a hand wheel 289 is formed. The inner end of the tubular member 288 engages a race 291 of a thrust bearing 292. An opposite race 293 of the bearing is provided with an outer spherical surface adapted to extend into a complementary opening formed at one side of a ring 294. Two diametrically opposed lugs 296 formed on the ring 294 project into longitudinal slots 297 which are formed in the tube 286. One of the lugs 296 is provided with a pointer 298 adapted to indicate readings on a scale 299 in pounds per square inch tire pressure or the total load in pounds carried by the vehicle. One end of a coil spring 301 engages the ring 294, while the opposite end thereof abuts an enlarged end 302 of a rod 303 extending through the convolutions of the spring 301, the ring 294, the bearing 292 and into the tubular member 288.

The diaphragm end of the regulating device 227 and the discharge duct therefrom are connected to a swivel 243 by conduit 246. The swivel connection 243 is identical to the swivel connection 43 hereinbefore described and the air from the regulating device is similarly delivered therefrom by a conduit 304 to a pneumatic tire 305. The pressure in the tire 305 is readable on a gauge 306 connected by a conduit 307 to the delivering duct of the regulating device 227.

In the operation of this embodiment of the invention, the hand wheel 289 is adjusted according to the load carried by the vehicle as indicated by the pointer 298 on the scale 299. The enlargement 302 thus serves to balance the valve actuating mechanism of the regulator, according to the desired ratio as hereinbefore described in the description of the operation of the automatically operable regulating device 27.

From the foregoing description, it is apparent that the invention is readily adaptable for employment in connection with the operation of many types of vehicles and that the service rendered by the tires of such vehicles will be increased substantially. At the present rapid rate of increase in the number of heavy trucks and busses and owing to the relatively high cost of tire mileage of such vehicles, the invention obviously is capable of rendering a great saving in the cost of operating such vehicles.

Although I have illustrated only the preferred forms which my invention may assume and have described those forms in detail, it will be apparent to those skilled in the art that it is not so limited but that various minor modifications and changes may be made therein without departing from the spirit of the invention or from the scope of the appended claims.

What I claim is:—

1. A tire inflation regulating system comprising means for supplying fluid under pressure, a conduit extending between the fluid supplying means and a tire casing and having a branch portion in communication with the atmosphere, a valve for closing the branch, a valve between the branch and the fluid supplying means for closing the conduit, a normally balanced member for operating the valves alternately and a second means for supplying fluid under pressure operable to displace the member from its normal balanced position, and means for returning the member to the latter position.

2. A tire inflation regulating system comprising means for supplying fluid under pressure, a conduit having a branch portion in communication with the atmosphere, extending between the fluid supplying means and a tire casing, a valve for closing the branch, a valve between the branch and the fluid supplying means for closing the conduit, a normally balanced member for operating the valves alternately, tire fluid pressure actuated means for displacing the member from its normal balanced position for opening the valve in the branch and variable fluid pressure means tending constantly to displace the member in the opposite direction for opening the valve in the conduit.

3. A tire inflation regulating system for supporting variable loads, comprising means for supplying fluid under pressure to a tire, means for normally preventing the flow of the fluid to the tire, means controlled by the variable loads constantly tending to operate the second means to permit the flow of fluid to the tire, and means actuated by the fluid pressure in the tire for opposing the operation of the third means.

4. A tire inflation regulating system for supporting variable loads comprising means for supplying fluid under pressure to a tire, a valve normally preventing the flow of fluid to the tire, means controlled by the variable loads constantly tending to open the valve and means opposing the operation of the second means in proportion to the pressure of the fluid in the tire.

5. A tire inflation regulating system comprising means including a conduit provided with a valve for supplying fluid under pressure to a tire, means for supporting a load upon a fluid pressure system, means for utilizing the pressure in said system for opening the valve, and means actuated by the pressure of the fluid in the tire for opposing the operation of the latter.

6. A tire inflation regulating system for supporting variable loads comprising means for supplying fluid under pressure to a tire, a valve normally preventing the flow of fluid thereto, means tending to retain the valve in a closed position, and means controlled by the variable loads constantly tending to open the valve and for opening the valve when the load is increased.

In witness whereof, I have hereunto signed my name.

Signed at Akron, in the county of Summit, and State of Ohio, this 15 day of November, 1927.

ELOV F. MAAS.